INVENTORS.
JOHN L. DICKMANN
GARTH F. NICOLSON
BY
John O. Evans, Jr.
ATTORNEY

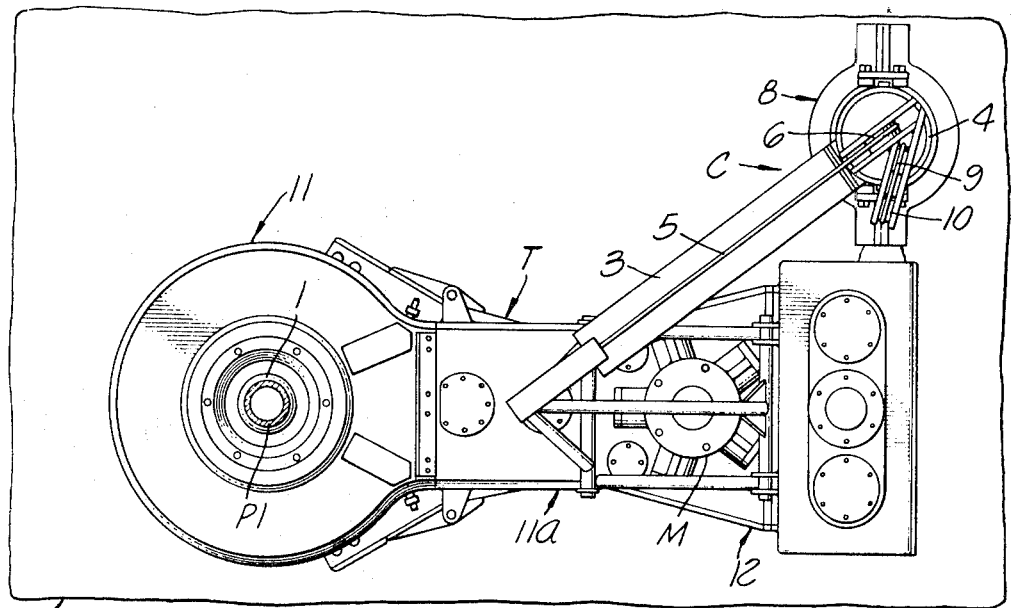
FIG. 1.
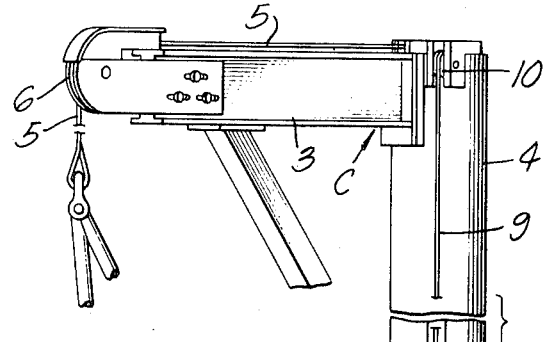
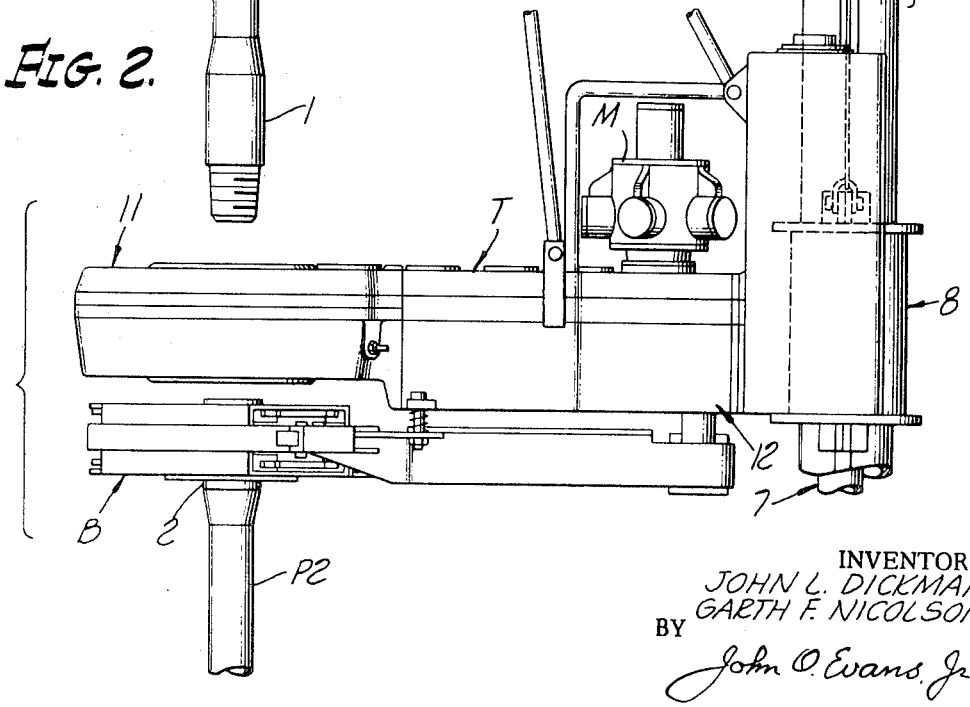
FIG. 2.
INVENTORS.
JOHN L. DICKMANN
GARTH F. NICOLSON
BY
John O. Evans Jr.
ATTORNEY INVENTORS.
JOHN L. DICKMANN
GARTH F. NICOLSON
BY
John O. Evans, Jr.
ATTORNEY Dec. 29, 1970   J. L. DICKMANN   3,550,485
POWER PIPE TONGS WITH VARIABLE BRAKE
Filed May 16, 1969   6 Sheets-Sheet 6

United States Patent Office 3,550,485
Patented Dec. 29, 1970

3,550,485
POWER PIPE TONGS WITH VARIABLE BRAKE
John L. Dickmann, Whittier, and Garth F. Nicolson, Huntington Beach, Calif., assignors to Byron Jackson Inc., Long Beach, Calif., a corporation of Delaware
Filed May 16, 1969, Ser. No. 825,196
Int. Cl. B25b 17/00
U.S. Cl. 81—57.15                    10 Claims

ABSTRACT OF THE DISCLOSURE

Power pipe tongs in which pipe gripping jaws are actuated into pipe gripping positions from retracted positions by cams and cam followers on an outer driven ring and on the jaws, the jaws being carried by an inner ring, rotation of the outer ring relative to the inner ring effecting camming of the jaws to the pipe gripping positions, and in which a brake band is anchored on the tong housing and is engaged with the inner ring, a fluid pressure expansible conduit engaging the brake band to effect frictional engagement of the latter with the inner ring throughout substantially the entire extent of the brake band, the braking force being a function of the pressure applied to the expansible conduit.

BACKGROUND OF THE INVENTION

Various power operated pipe tongs for making up and breaking out pipe joints, such as joints between lengths of well drilling pipe, drill collars, well casing, and tubing, have heretofore been devised which involve, essentially, an outer power driven member or ring and an inner member or ring, the inner ring carrying jaws movable radially or generally radially with respect to a central pipe joint opening into pipe gripping positions from retracted positions, the movement of the jaws inwardly to the pipe gripping positions being effected by cams and cam followers responsive to rotation of the outer ring relative to the inner ring.

While, theoretically at least, any means may be availed of for preventing initial rotation of the inner or jaw carrying ring with the outer ring, the effective braking of the inner ring until the jaws have been sufficiently forced radially into engagement with pipe so as to transmit the necessary torque without slipping on the pipe, has long posed problems.

DESCRIPTION OF THE PRIOR ART

Braking means have heretofore been provided which are self-energizing, in the sense that a brake band is disposed about at least a portion of the inner ring, the brake band being capable of shifting to anchor at opposite ends, as exemplified in the prior United States Letters Patent granted Oct. 30, 1951 to A. E. Martois, No. 2,573,212.

Such brake bands rely on the inherent ability of the bands to effectively hold the inner ring of the tong assemblies against rotation, while the outer ring is driven to effect gripping engagement of the pipe by the gripping jaws, irrespective of variations in pipe condition, pipe diameter, or gripping die condition. As a consequence, such tongs have experienced difficulty in operating over a range of pipe sizes, and effectively gripping the pipe, notwithstanding the condition of the pipe surface or the tong dies.

Efforts have also been made to effect pressurized engagement of the brake band, as exemplified in the pending application for Letters Patent of the United States, Ser. No. 687,830, filed Dec. 4, 1967, in the name of John L. Dickmann et al. However, since the application of pressure to the brake band in the tong assembly of the latter application for patent is at one end of the band, tending to pull the band against an anchor at the other end of the band, the effective braking action is better when the tong is operating in one direction than when the tong is operating in the other direction.

However, inasmuch as it is desirable that the tong be operable in either direction, without requiring that the tong be rolled over to allow rotation of the outer ring in the same direction to effect make up and break out of pipe joints, such unidirectional energization of the brake band is not fully effective to apply sufficient, or at least the same, braking force to the inner ring to assure equal pipe gripping force when the tong is being employed to make up and break out pipe joints. Thus, tong die life is diminished and, in some cases, where high torque is to be employed in making up drill pipe or drill collar joints or in breaking out such joints, effective gripping of the pipe may be practically impossible.

SUMMARY OF THE INVENTION

The present invention provides a brake in a power tong mechanism, wherein a brake band engages the inner ring and is equally pressurized into frictional engagement with the inner ring in either direction of rotation of the outer ring, so that the tong is equally effective in making up and breaking out pipe joints.

More particularly, the invention provides a tong assembly including an outer power driven ring and an inner jaw carrying ring, the jaws of which are cammed into pipe gripping positions from retracted positions responsive to rotation of the outer ring in either direction relative to the inner ring, and wherein a brake band extends about a portion of the inner ring and is pressurized into frictional engagement with said portion of the inner ring throughout a substantial portion of the angular extent of the brake band.

In such a construction, the brake band is pressurized into braking engagement with the inner ring by a deformable tubular member extending with the band about the outer ring throughout a substantial portion of the angular extent of the brake band. A confining member engages the deformable tube in opposed relation to the band to take the reaction of the deformable tube.

In addition, in accordance with the invention, the brake band is shiftably anchored at its opposite ends, so as to anchor at one end when the tong is operating in one direction and to anchor at the other end when the tong is operating in the other direction. More specifically, the brake band is anchored at its opposite ends on the confining member, and the confining member is anchored against movement in either direction.

With such a construction, the brake means may be energized or applied to effect the same pressure engagement of the brake band, notwithstanding the direction of rotation of the outer ring, and the band itself is anchored at either end depending upon the direction of rotation. Thus, the tong assembly is capable of making up or breaking out joints of pipe with equal efficiency. Moreover, the braking force may be varied by the application of more or less pressure to the deformable tube and, therefore, the braking force necessary to effectively cause non-slipping engagement of the tong dies with the pipe joint may be selected and applied for different sizes of pipe, different make up or break out torques, and different kinds of pipe, thus resulting not only in more efficient tonging operation but also in greater tong die life and less down time for tong die replacement.

BRIEF DESCRIPTION OF THE DRAWINGS

FIG. 1 is a top plan view of tong apparatus made in accordance with the invention;

FIG. 2 is a view in side elevation of the apparatus of FIG. 1;

DESCRIPTION OF THE PREFERRED EMBODIMENT

Figure 3:
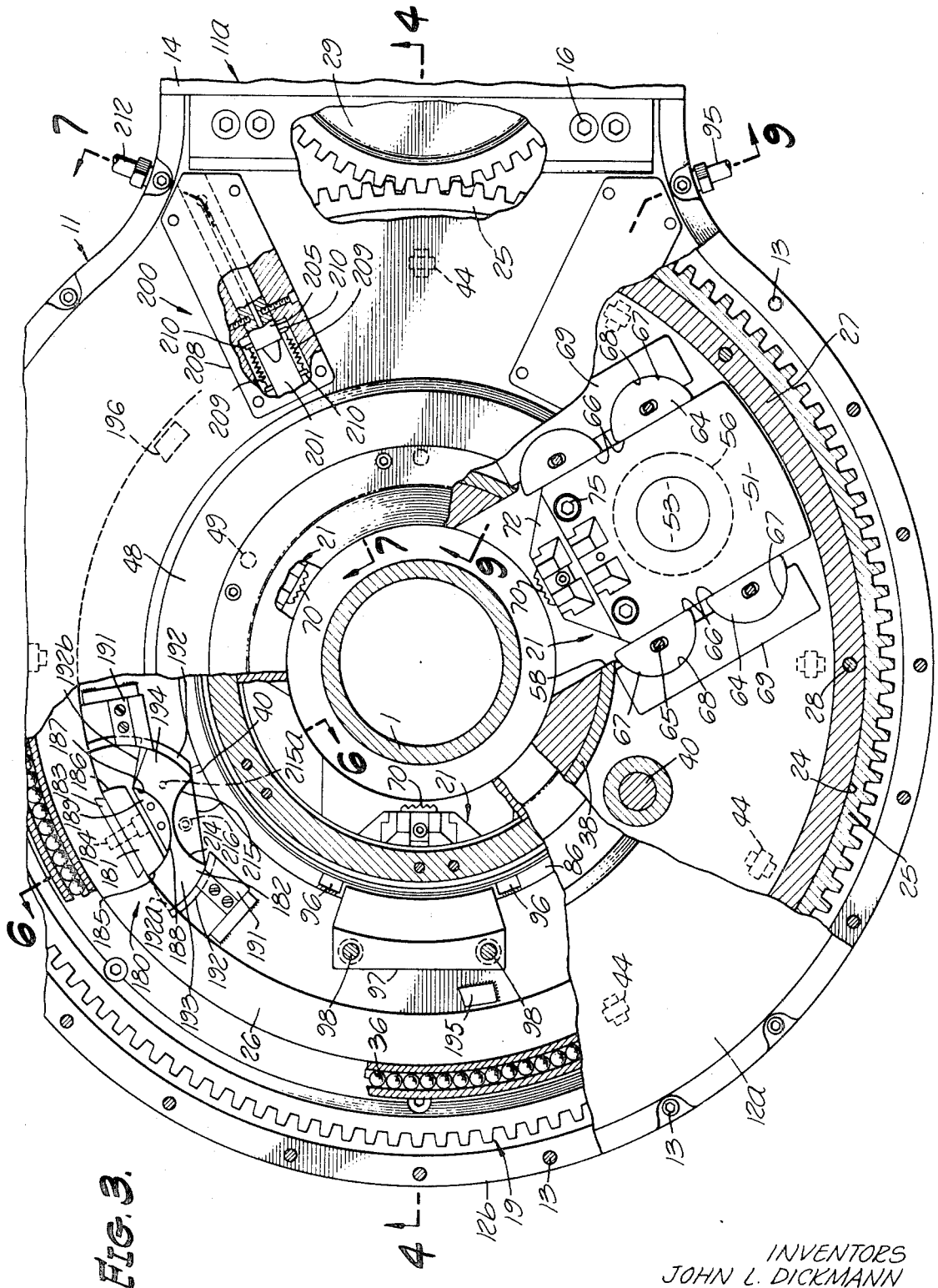
FIG. 3 is an enlarged fragmentary view of the tong head apparatus with parts broken away.

Referring first to FIGS. 1 and 2, there is generally illustrated a tong assembly T adapted to be supported above the floor F of a drilling platform which may be part of the usual drilling rig mounted above a well bore and into which pipe, such as drill pipe or casing, is adapted to be run and from which such pipe will be sometimes pulled, as in the case of drill pipe. Such a pipe is illustrated in FIGS. 1 and 2 as including an upper stand of pipe P1 in the illustrative form of a stand of drill pipe having a tool joint pin end 1 thereon adapted to be threadedly connected by the tong T to the box end 2 of a length or stand of the pipe P2 disposed in the well bore. In order to support the tong assembly T in an operative position above the well bore so that the stand of pipe P1 may be lowered therethrough for engagement with the pipe P2, a suitable crane C is provided, including a boom 3 projecting from a vertically disposed post 4. A cable 5 extends over sheaves 6, 6 and is connected to a pressure operated cylinder mechanism 7 disposed within the post 4, whereby the tong assembly T may be raised and lowered relative to the post 4 and thereby relative to the well bore into which or from which pipe is being removed. Also forming a part of the crane C is a rabbit 8 slidable vertically along the post 4, there being a second cable 9 also connected to the upper end of cylinder 7, extending over a sheave 10, and connected also to the rabbit 8 so that the mass of the tong assembly T may be properly supported. This crane assembly may be of any desired type, such as that disclosed in the application for United States Letters Patent filed Dec. 4, 1967 entitled Power Tong Crane, Ser. No. 687,812, now U.S. Pat. 3,505,913.

The tong assembly T, as is typical of tongs of the type here involved, includes a head section generally denoted at 11 and a supporting and power transmission section generally denoted at 11a. The latter section in the illustrative embodiment has a hydraulic motor M adapted to be connected to a suitable source of motive fluid under pressure so as to drive the transmission mechanism of the tong assembly, which may be of any desired type, but which may be constructed in accordance with the disclosure in the application for United States Letters Patent filed Dec. 4, 1967 entitled Power Pipe Tong Transmission Assembly, Ser. No. 687,815, now U.S. Pat. 3,516,308.

Head section 11 of the tong assembly T is, as will be later described, constructed so as to be operated by the hydraulic motor M to grip and effect rotation of the pin end 1 of the pipe P1 while the box end 2 of the pipe P2 is held against rotation, either in the usual rotary table slips or by the back-up tong assembly generally denoted at B, which may be made in accordance with the disclosure in the application for United States Letters Patent filed Dec. 4, 1967 entitled Back-Up Tong for Power Pipe Tongs, Ser. No. 687,810, now U.S. Pat. 3,507,174.

The power tong assembly head section 11 comprises a suitable housing or case including an upper case section 12a and a lower case section 12b joined together at a horizontal parting line as by a suitable number of fasteners 13. The case 12a, 12b is open at one side for connection to the case 14 of the power tong transmission 11a, by which the tong head 11 is adapted to be driven in response to operation of the above-mentioned motor M. Suitable fastenings 16 are employed to connect the upper tong head case section 12a to the transmission case 14, and suitable fastenings 17 are employed for connecting the lower tong head case section 12b to the transmission case 14.

The case 12a, 12b essentially provides an annular channel 18 in which is revolvably disposed an outer ring assembly generally denoted at 19. Concentrically within the outer ring assembly 19 is an inner ring assembly generally denoted at 20 which supports for radial movement a plurality of circumferentially spaced pipe gripping jaws generally denoted at 21, a cam ridge 22 formed as a part of the outer ring assembly 19, in this embodiment being employed to effect radial movement of the jaws 21 into and out of engagement with the tool joint 1 of the pipe P1 during the making up and breaking out of pipe joints comprising the tool joint 1 in response to relative angular movement in opposite directions between the outer ring 19 and the inner ring 20, as will hereinafter more fully appear.

The outer ring assembly 19 in the illustrative embodiment includes a ring-like body 23, to the outer peripheral wall 24 of which is affixed a ring gear 25. This ring gear 25 has an upper flange 26 which overlies an annular flange 27 on the outer ring body 23 and which is secured thereto as by suitable fastenings 28. Means are provided for driving the ring gear 25 including the output or driven gear 29 of the transmission assembly 11a the output gear 29 being in mesh with the ring gear 25, as best seen in FIG. 3. The outer ring assembly 19 also includes a bottom plate 30 secured at its outer periphery as by fasteners 31 to an annular flange 32 which depends from the outer ring body 23, this plate 30 extending inwardly from the open channel 18 of the case 12a, 12b and having a seal ring engaging flange 33 supported therebeneath and engaged by a seal 34 seated in an end flange 35 of the lower case section 12b.

Means are provided for revolvably supporting the outer ring assembly 19 in the case 12a, 12b. In the illustrative embodiment such means includes upper bearing race and ball bearing means 36 interposed between the upper ring flange 26 and the case section 12a and lower bearing race and ball bearing means 37 interposed between the lower outer ring flange 30 and the case section 12b.

The inner ring assembly 20 comprises an upper ring body section 38 and a lower ring body section 39 joined together by pins 40 having nuts 41 threaded thereon so as to clamp the inner ring sections 38 and 39 together. The upper inner ring section 38 includes an outwardly extended flange section 42, and the lower inner ring section 39 includes an outwardly extended flange section 43 defining therebetween an annular space in which the outer ring body 23 is disposed.

Means are provided for supporting the inner ring assembly 20 for angular movement with respect to the outer ring assembly 19, and, in order to reduce drag friction, such means may conveniently comprise a suitable number of roller assemblies generally denoted at 44 carried beneath the inner ring upper flange 42 and engaged with the top surface 45 of the outer ring body 23. These roller assemblies 44 may be suitably angularly spaced about the tong head assembly, as seen in FIG. 3, between the jaws 21.

In order to provide a top seal corresponding to the seal provided by the seal ring 34 between the outer ring assembly 19 and the case section 12a, an upper seal ring 46 is provided at the inner periphery 47 of the upper case section 12a, and an annular flange 48 secured to the upper inner ring section 38, as by fasteners 49, is provided for sealing engagement with the upper seal ring 46.

Figure 4:
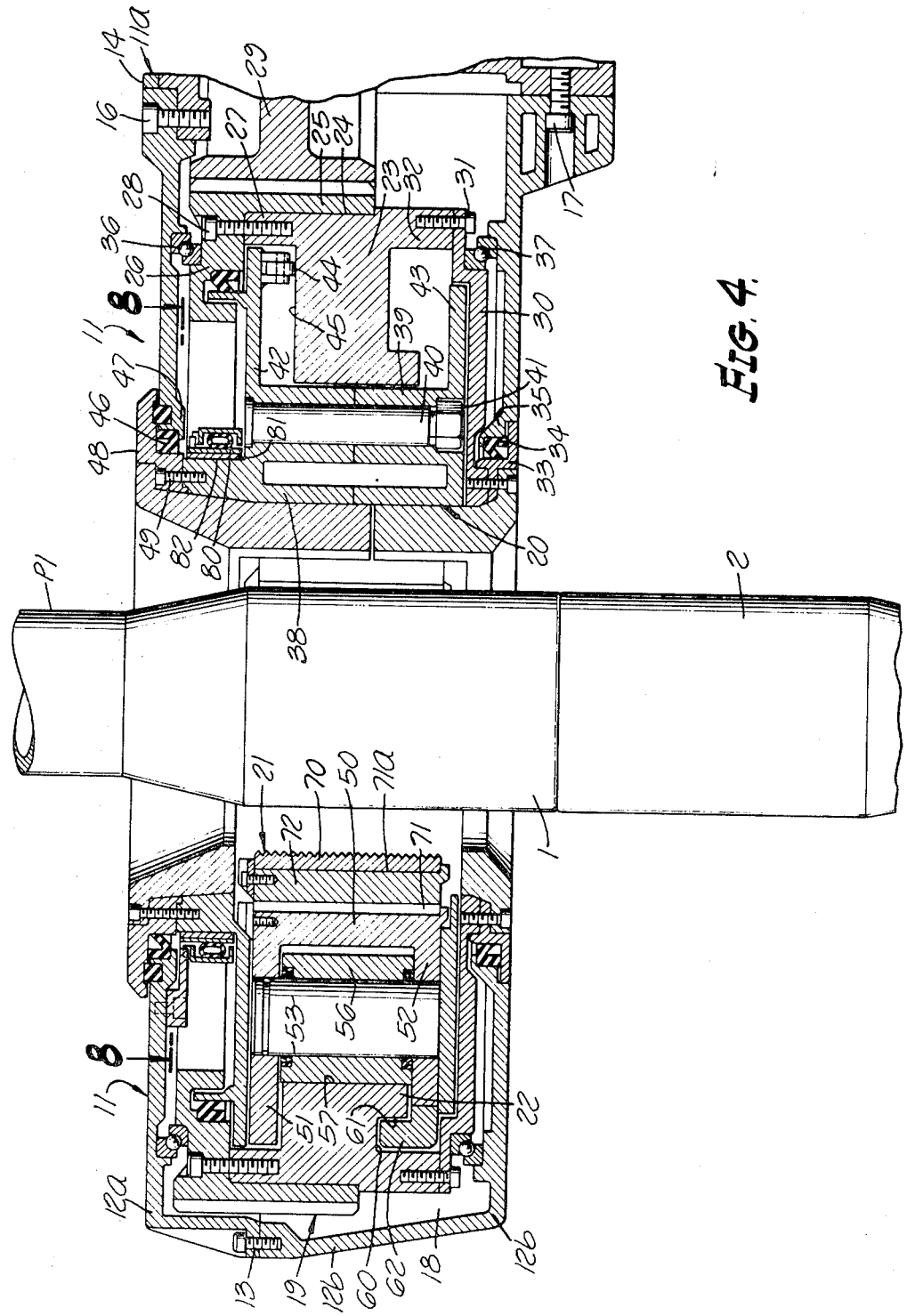
FIG. 4 is a view in vertical section, as taken on the line 4—4 of FIG. 3.

Each of the jaws 21, as best seen in FIG. 4, comprises a channel-shaped body composed of an inner end wall 50 and upper and lower walls 51 and 52, respectively. A bearing supporting shaft 53 extends between the top and bottom walls 51 and 52 of the respective jaws 21 and supports for rotation thereon a bearing sleeve 56 which is engageable by the inner peripheral surface 57 of the outer ring body 23.

Figure 5:
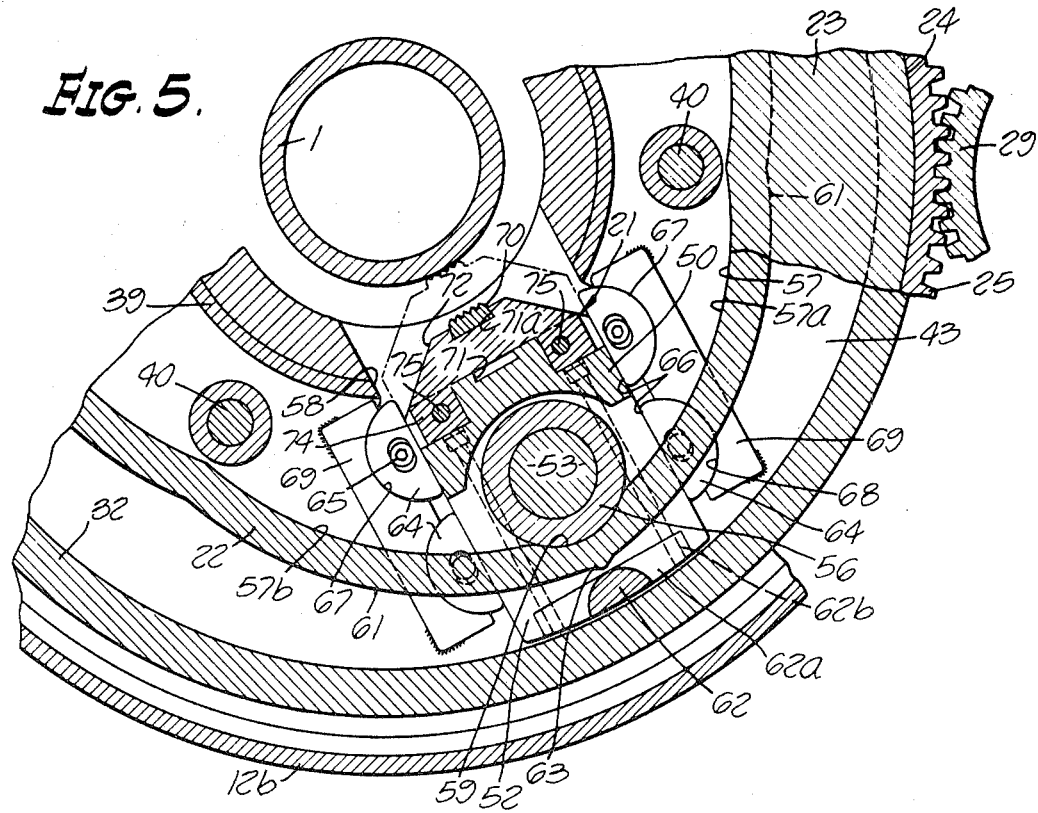
FIG. 5 is a fragmentary detail view in horizontal section illustrating a typical jaw and camming means therefor.

Referring to FIG. 5, it will be seen that the jaws 21 are respectively disposed in windows 58 provided in the inner ring assembly 20, whereby the jaws 21 are adapted to be moved radially with respect to the center of the assembly. The inner peripheral surface 57 of the outer ring body 23 provides a cam surface engageable with the bearing sleevs 56 of the jaws 21 for effecting radial inward movement of the jaws 21 from fully retracted positions, at which the bearing sleeves 56 are disposed in depressions 59 in the cam surface 57, to positions for engaging and gripping the pipe tool joint 1 of the pipe P1. Spaced radially outwardly from the cam surface 57 of the outer ring body 23, the bottom wall of the ring body 23 is provided with a downwardly opening channel 60 (FIG. 4) having a side wall 61 which, except at the depressions 59, is substantially parallel to the cam surface 57; and the respective jaws are each provided with a lug 62 projecting outwardly from the bottom wall 52 of the jaw and upwardly into the channel 60 so as to slidably engage with the surface 61, whereby the jaws 21 are each adapted to be positively retracted from a pipe gripping position to a fully retracted position. As shown in FIG. 5, the surface 61 includes an outward projection 63 engageable with the lug 62 of the jaws to effect positive movement of the bearing sleeves 56 into the depressions 59 of the cam surface 57.

Means are provided for slidably supporting the jaws 21 for radial movement with respect to the tong head assembly, and such means, as best seen in FIG. 5, may comprise suitable guide elements 64 each mounted on pivot pins or fasteners 65 for slight rocking motion. Each of the guide elements 64 has a flat surface 66 slidably engageable with the respective top and bottom walls 51 and 52 of the jaws 21 and an arcuate surface 67 slidably engaging in an arcuate seat 68 in a supporting block 69, the various supporting blocks 69 respectively being welded or otherwise suitably fastened to the top and bottom walls 42 and 43 of the inner ring assembly 20.

Referring to FIG. 5, it will be noted that the lug 62 of the respective jaws 21, which is engageable with the cam surface 61 to effect retraction of the jaws, is removably attached to the bottom wall 52 of the respective jaws. The lug 62 is provided on a supporting base section 62a which is secured to the jaw wall 52 as by bolts 62b which extend through the inner end wall 50 of the jaw so as to be accessible within the pipe opening in the tong head assembly. Thus the jaw retracting lugs 62 may be disconnected from the jaws 21 so that the jaws may be removed from the tong assembly through the windows 58, thereby obviating the necessity of disassembling the case 12a, 12b and the inner and outer ring assemblies in order to effect removal of the jaws 21 for service or repair.

Each of the jaws 21, furthermore, is adapted to be provided with pipe engaging and gripping dies 70. Such dies characteristically are adapted to be removably received in dovetailed slots in the jaws of tongs, and, accordingly, the inner wall 50 of each of the jaws 21 is provided with such a dovetailed slot, as at 71. In order that the tong assembly may be capable of effective utility over a wide range of pipe sizes, the jaws 21 may be provided with auxiliary die carriers 72 projecting radially inwardly and being provided with a slot 71a adapted to receive the tong die 70. In the illustrative embodiment, the die carriers 72, at their opposite sides, are provided with ears 74 adapted to be received in companion slots in the jaws 21 and to be secured in place as by fasteners 75.

In order to effect relative angular movement between the cam surfaces 57 and the bearing sleevs 56 of the respective jaws, whereby to effect inward or outward radial movement of the jaws 21, it is necessary that the inner ring assembly 20 remain relatively stationary during rotative movement of the outer ring assembly 19. Accordingly, brake means, including a brake band 80 having friction lining 81 thereon, is disposed about a cylindrical wall 82 provided about the upper inner ring section 38. In order to maintain effective engagement of the brake means with the cylindrical surface 82, the brake band 80 may be of resilient material, such as brass, having an inherent inside diameter less than the diameter of the wall 82 so that the friction lining material 81 is maintained in frictional coengagement with the wall 82.

Figure 9:
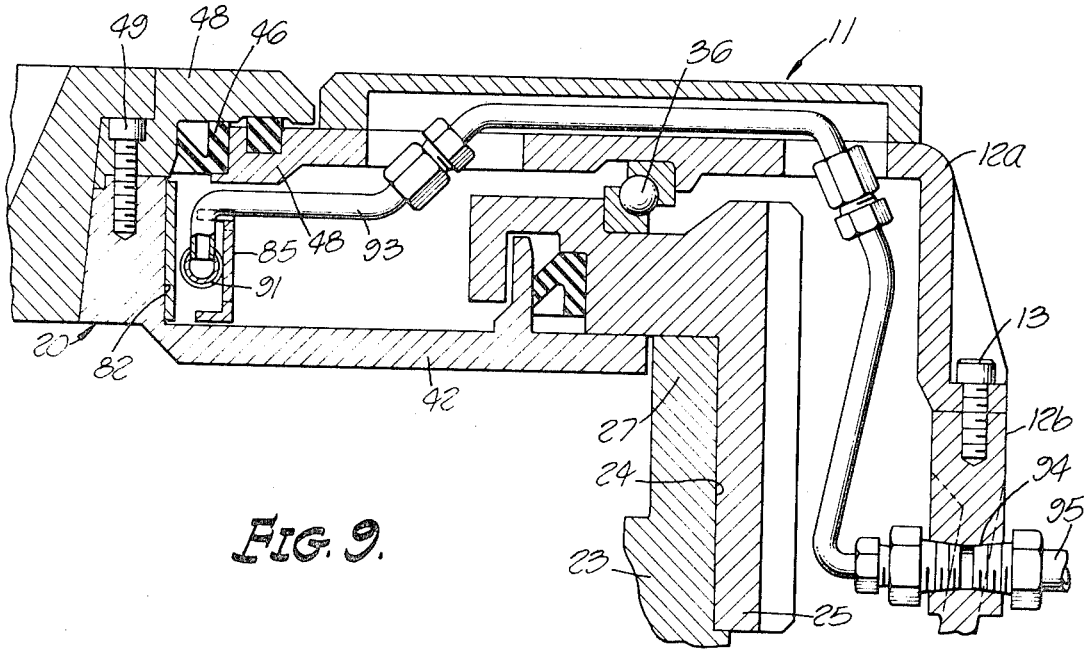
FIG. 9 is a fragmentary view in vertical section, as taken on the line 9—9 of FIG. 3.

Referring to FIGS. 6 through 11, means are illustrated which, in accordance with the invention, are adapted to effect the uniform application of brake applying pressure to the brake band 80 throughout its entire circumferential extent. Thus there is illustrated a circumferentially extended channel member 85 having upper and lower flanges 86 and 87, respectively, which define with the brake band 80 a circumferentially extended chamber 88. Disposed in this chamber 88 is an expansible tube 89 which is preferably normally circular in cross-section but which is confined between the channel member 85 and the brake band 80 under initial compression and is therefore shown as being oval, whereby to provide a flat inner peripheral surface 90 in engagement with the brake band 80. At its ends 89a and 89b (FIGS. 8 and 11) the tube 89 is connected in fluid communication with a connector section 91, the respective ends 89a and 89b being slipped over the extremity of the connector section 91 and secured in place as by a hose clamp 92, the connector section 91 preferably being provided with an annular channel 93 into which the tube 89 is deformed by the hose clamp 92. Intermediate its ends the connector section 91 is in fluid communication with a hydraulic conduit 93 which, as seen in FIG. 9, is provided with suitably connected sections leading to fitting means 94 for connection to an external conduit 95 leading from a suitable source of fluid under pressure.

Figure 8:
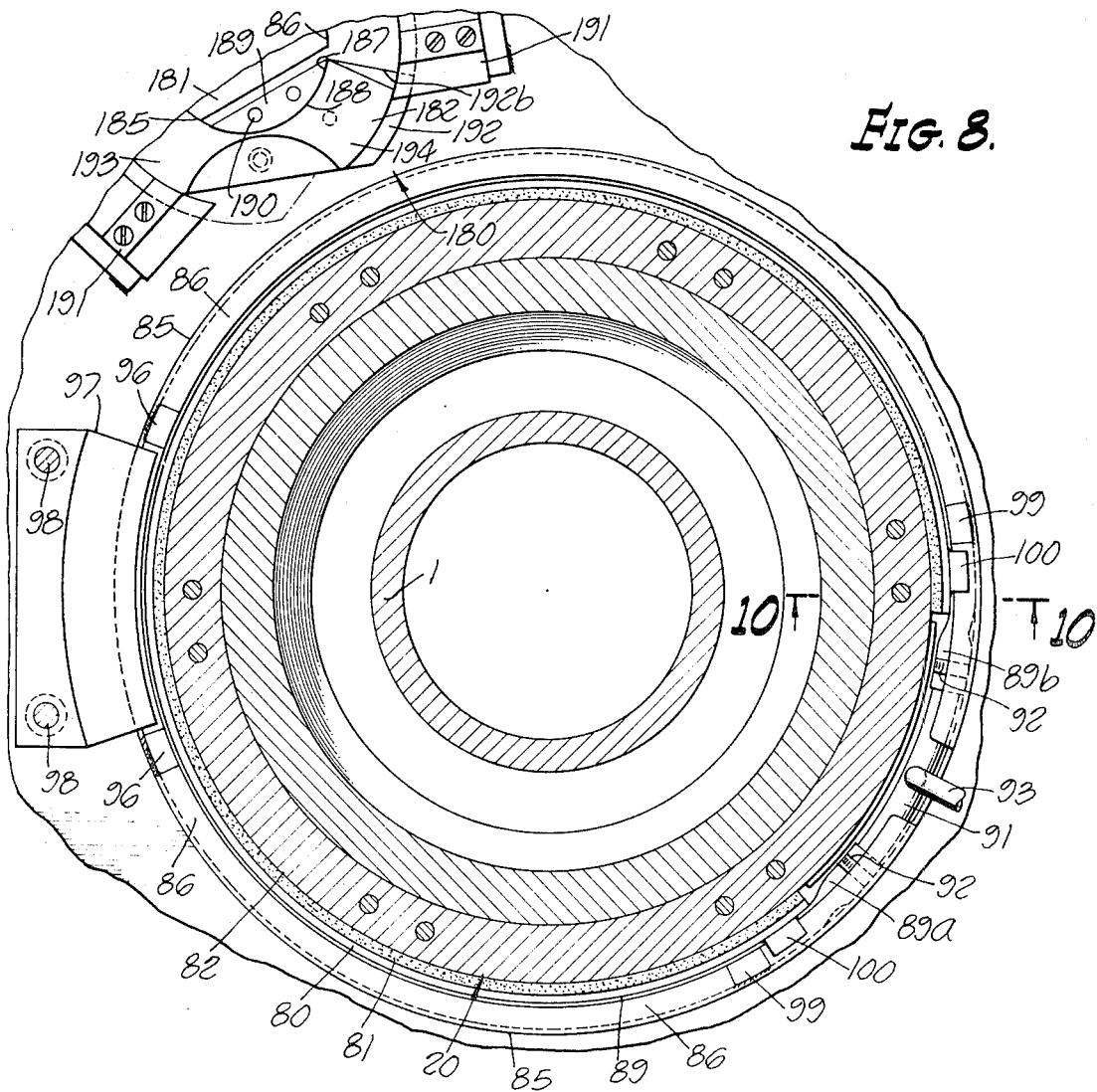
FIG. 8 is a fragmentary detail view in horizontal section more particularly illustrating the brake means and reverse stop mechanism, as taken on the plane of the line 8—8 of FIG. 4.
Figures 10, 11:
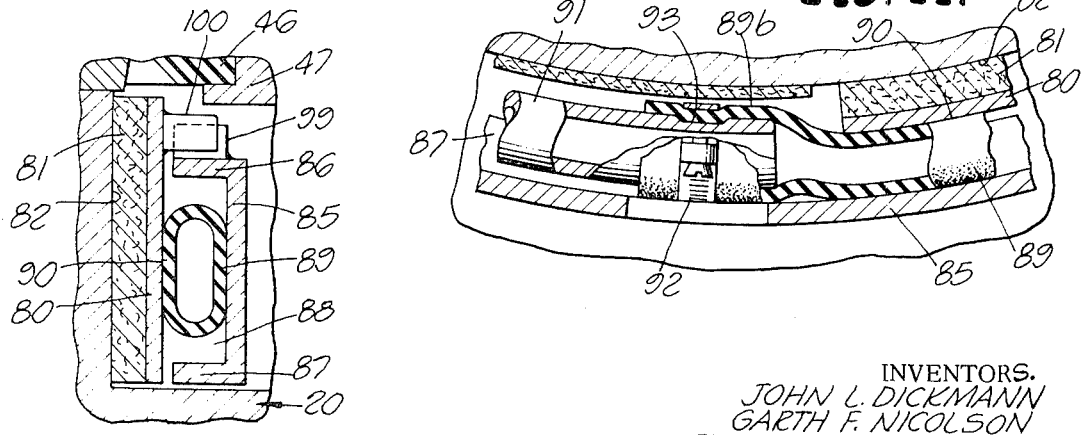
FIG. 10 is a fragmentary detail view in section, as taken on the line 10—10 of FIG. 8.
FIG. 11 is a detail view partly in section and partly in elevation illustrating the connection of the brake tube to a fluid conduit.

Accordingly, it is apparent that when pressure fluid is supplied from such a source the expansible tube 89 will be expanded throughout its entire circumferential extent so as to apply a constrictive force to the brake band 80, the channel member 85 being sufficiently rigid so as to resist outward deformation. In order to prevent rotation of the brake band 80 along with the inner ring assembly 20 by virtue of the frictional engagement of the friction lining 81 with the annular wall 82, anchor means are provided whereby the brake band 80 is limited to slight angular movement in either direction and whereby the brake means is essentially self-energizing in either direction. This anchor means includes, as seen in FIG. 8, a pair of angularly spaced lugs 96, 96 which are provided on the upper flange 86 of the channel member 85 and located at opposite sides of a fixed stop 97 which is secured by appropriate fasteners 98 to the tong case. These stops 96 serve to prevent angular movement of the channel member 85, and the channel member 85 in turn has additional angularly spaced lugs 99 on the upper flange 86 thereof which are adapted to cooperate with a pair of stop lugs 100 which are provided adjacent the ends of the brake band 80.

Accordingly, depending upon the direction of rotation of the inner ring assembly 20, one of the lugs 96 on the channel member 85 will engage the fixed stop 97 and one of the stop lugs 100 on the brake band 80 will engage one of the lugs 99 on the channel member 85, so that the brake band 80 is allowed only limited angular rotation such as will serve to effect self-energization of the brake means.

Reverse stop means are provided to prevent continued relative rotation between the outer ring assembly 19 and the inner ring assembly 20 following retraction of the jaws 21, whereby to prevent reclosure of the jaws 21. Such reverse stop means is generally denoted at 180 in FIGS. 3, 6 and 8 and includes a first stop member 181 carried by the outer ring assembly 19 and a second stop member 182 carried by the inner ring assembly 20 and alternately positionable to prevent relative rotation of the outer ring and inner ring in opposite directions when the jaws 21 are being retracted, beyond a point at which the bearing sleeves 56 are disposed in the cam surface depressions 59. The stop member 181 comprises an elongated body having a dovetail connection as at 183 with the upper flange 26 of the outer ring assembly 19, the body 181 being secured in place as by a fastener 184. At one end the stop member 181 has an arcuate stop surface 185 and at its other end the stop member 181 has an arcuate stop surface 186 respectively operable to engage the alternately positionable stop member 182 to prevent further rotation of the outer ring relative to the inner ring upon opening of the jaws 21 during the making up of pipe joints and during the breaking out of pipe joints. In FIG. 3 the alternately positionable stop member 182 is in a position for stopping relative rotation of the inner and outer rings upon opening of the jaws 21 during the use of the tong for making up pipe joints.

Figure 6:
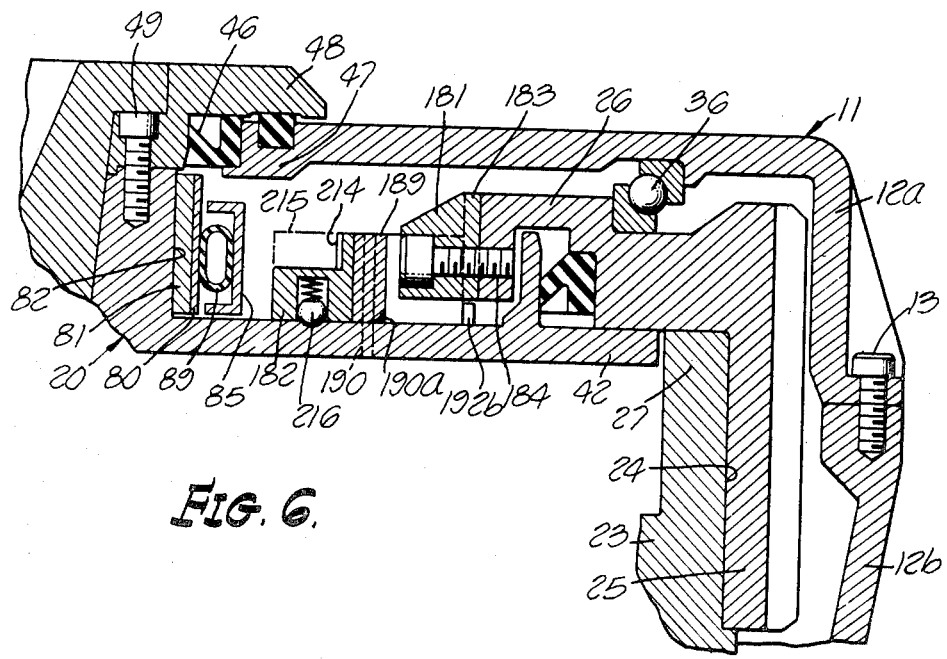
FIG. 6 is a fragmentary view in vertical section, as taken on the line 6—6 of FIG. 3.

This alternately positionable stop member 182 is of arcuate form having a concave arcuate surface 187 piloted upon a convex arcuate surface 188 of a guide block 189 which is suitably attached to the upper wall 42 of the upper inner ring section 38 as by roll pins 190 and welding at 190a (FIG. 6). The stop member 182 is shiftably supported on the inner ring section 38 by a pair of retainers 191 which overlie an edge flange 192 of the stop member 182 so as to allow the member 182 to move angularly about the guide block 189 between the position shown in FIG. 3, at which the end 193 of the member 182 is disposed in the path of the stop member 181, and an alternate position at which the other end 194 of the member 182 will be disposed in the path of the stop member 181. In these alternate positions the stop member 181 is free to pass one of the ends of the stop member 182 so as to abut with the other end of the stop member 182. When, as seen in FIG. 3, the stop member 181 is engaged with the end 193 of the stop member 182 the latter is rigidly backed up by its retainer 191. In addition, the end 193 of the stop member 182 is provided with an end flange 192a and the end 194 of the stop member 182 is provided with an end flange 192b, these end flanges essentially being continuations of the edge flanges 192 and being adapted, when the stop member 182 is in either of its extreme positions, to underlie the inner periphery of the top flange 26 of the outer ring assembly 19, whereby to further reinforce the mounting of the stop member 182 on the top wall 42 of the inner ring assembly 20.

As seen in FIG. 3, means comprising a pair of angularly spaced stop projections 195 and 196, suitably affixed as by welding to the uper wall 42 of the inner ring assembly 20, are provided for limiting relative angular movement between the inner ring assembly 20 and the outer ring assembly 19 to an extent in excess of the angular movement required to effect the full projection of the jaws 21. Thus, when the outer ring assembly 19 is driven and no pipe joint is present between the jaws to limit their inward movement, the reverse stop member 181 is prevented from moving away from the reverse stop member 182 beyond a location at which the end surface 185 of the stop member 181 abuts with the stop lug 195 or the end surface 186 of the stop member 181 abuts with the stop lug 196. Such limited angular movement between the inner and outer ring assemblies 20 and 19, respectively, has two advantages, the first being that the outer ring assembly 19 will be prevented from rotating relative to the inner ring assembly 20 to such an extent that the stop member 181 can engage the wrong side of the stop member 182, and the second advantage being that during the opening of the jaws 21, when no pipe joint is present between the jaws to prevent inward movement of the jaws, it is not possible for the outer ring assembly 19 to accelerate to such an extent as to apply damaging shock loads on the stop member 182 upon engagement therewith by the stop member 181.

Figure 7:
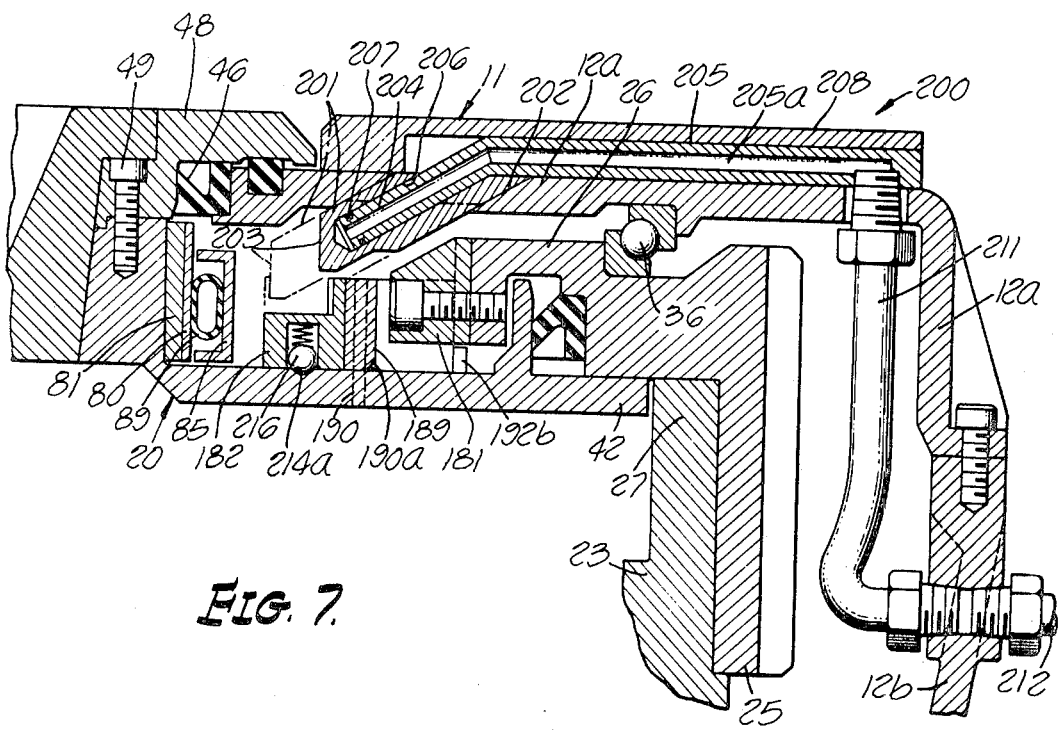
FIG. 7 is a fragmentary view in vertical section, as taken on the line 7—7 of FIG. 3.

Abutment means are provided for effecting angular movement of the alternately positionable stop member 182 for cooperative engagement with the stop member 181 in the reverse mode of operation of the tong assembly, such abutment means being generally denoted at 200 and being seen in FIGS. 3 and 7. This abutment means includes a block 201 extending at an angle through a rectangular opening 202 in the upper case section 12a of the case and having at its inner end a downwardly extended projection 203. The block 201 is reciprocably disposed on an angularly disposed cylindrical end section 204 of a fluid conductor member 205, the end 204 of the conductor member 205 extending into a bore 206 in the block 201 and having a suitable seal ring 207 thereon sealingly engaged in the bore 206. The conductor member 205 extends externally of the case section 12a and is covered by a protective plate 208 which is suitably affixed to the top case section 12a of the case, as seen in FIG. 3, and the conductor member 205 has a fluid pasage 205a therein for conducting fluid under pressure to the bore 206 of the abutment member 201 to effect outward movement of the abutment member on the end 204 of the fluid conductor member 205. Resilient means are provided for effecting return movement of the abutment member 201 when fluid pressure is relieved, such resilient means in the illustrative embodiment including a pair of coiled tension springs 209 connected at their ends to pins 210 respectively carried by the abutment member 201 and the conductor member 205, as best seen in FIG. 3.

Suitable means are provided for admitting fluid under pressure to the passage 205a of the fluid conductor member 205 and exhausting fluid from the passage 205a. In the illustrative embodiment a conduit 211 is disposed within the case at the outside of the ring gear 25 and has connection with a fluid conduit 212 leading into the case from a suitable external source of fluid under pressure (not shown). Preferably, air is employed as the pressure fluid for effecting projection of the abutment member 201 from the position shown in full lines in FIG. 7 to the position shown in broken lines.

When the end projection 203 of the abutment member 201 is in its broken line position in FIG. 7, and the outer ring assembly 19 is rotating in either direction within the case, the end projection 203 is disposed in the path of the alternately positionable stop member 182 for abutting engagement with the latter so as to shift the same between its alternate positions, depending upon the direction of rotation of the outer ring assembly.

Accordingly, the alternately positionable stop member 182 is provided with an arcuate depression forming an arcuate wall having a first end section 214 engageable by the projection 203 of the abutment means 200 when the stop member 182 is in the position shown in FIG. 3 and the outer ring assembly 19 and the inner ring assembly 20 are rotating in a clockwise direction; and a second arcuate wall 215 is provided which, when the stop member 182 is in the alternate position from that shown in FIG. 3, will engage the projection 203 of the abutment means 200 when the outer ring assembly 19 and the inner ring assembly 20 are rotating in a counter-clockwise direction, whereby the stop member 182 is alternately positionable depending upon the direction of rotation of the ring assemblies.

In order to prevent inadvertent shifting of the alternately positionable stop member 182 away from either of its alternate positions, spring-loaded detent means 216 are provided in the stop member 182 engageable in spaced depressions 214a and 215a when the stop member 182 is in its alternate positions. Such detent means 216 is best seen in FIG. 6 as being engaged in the ball engaging depression 215a to retain the stop member 182 in the position shown in FIG. 3.

In the use of the tong assembly B described above in combination with a power tong assembly T, the latter will be operated to grip and rotate a joint of pipe, in say a right-hand direction when a pipe joint is to be made up and during the initial stages of rotation of the pipe by the tong assembly T, the back-up tong assembly B may remain idle.

To make up the tool joint the power tong will be operated by supplying hydraulic fluid under pressure to the motor M so as to effect rotation of the ring gear 25 of the outer ring assembly 19 in a clockwise direction. Such rotation of the outer ring assembly 19 will cause movement of the camming section 57a of the inner peripheral wall 57 of the outer ring body 23 relative to the respective bearing sleeves 56 of the several pipe engaging jaws 21 so as to effect radial inward movement of the jaws in unison. Such inward movement of the jaws 21 will effect engagement of the dies 70 with the tool joint 1 of the pipe P1. Engagement of the jaws 21 with the tool joint 1 will then cause the inner ring assembly 20 to rotate in a right-hand direction along with the outer ring assembly 19 causing, thereby, threaded co-engagement of the tool joint section 1 with the tool joint section 2 of the pipe P2 which is disposed in the back-up tong assembly B. When the tool joint sections 1 and 2 shoulder and it is desired that the pipe P2 be held fast against rotation during the application of high make up torque to the pipe P1 by the power tong T, it is desired that the back-up tong B be operated to resist rotation of the pipe P2 in a right-hand direction.

Conversely, when the power tong assembly T is being employed to break out pipe joints by rotating the pipe P1 to the left, initial high torque loads will be imposed on the pipe joint, and the back-up tong B should be engaged with the joint 2 to prevent left-hand rotation thereof. In order to condition the power tong T for break out operations the alternately positionable stop member 182 should be shifted from the position shown in FIG. 3 to its alternate position, whereby to allow left-hand rotation of the outer ring assembly 19 relative to the inner ring assembly 20 to effect closure of the jaws 21 upon the tool joint 1 of the pipe P1 and then to cause left-hand rotation of said tool joint part. In order to shift the stop member 182, air under pressure is supplied to the passage 205a of the abutment means 200 so as to cause movement of the projection 203 to the position shown in broken lines in FIG. 7 in which position the projection 203 is disposed in the path of movement of the face 214 of the stop member 182 as the outer ring assembly 19 moves in a right-hand direction carrying the inner ring assembly 20 therewith, by virtue of engagement of the stop 182 with the traveling stop member 181. When the stop member 182 has been shifted by the abutment means projection 203 the power tong assembly T is in condition for breaking out tool joints.

Regardless of the direction of rotation of the pipe gripping mechanism, the inner ring assembly 20 must be held temporarily stationary while the outer ring assembly 19 is driven to effect the camming of the jaws 21 into engagement with the pipe joint 1. To accomplish this, fluid under pressure is admitted to the brake tube 89 through the conduit 93, so as to forcibly expand the tube 89 within the confines of the reinforced channel member 85. Such expansion of the tube 89 will force the brake band 80 throughout its entire circumferential extent towards the peripheral wall 82 of the inner ring assembly 20 so as to resist rotation of the latter. Rotation of the brake band 80 along with the inner ring assembly 20 will be precluded by engagement of one of the stop lugs 100 on the brake band 80 with one of the abutments 99 on the channel member 85 and the resultant engagement of one of the abutments 96 on the channel member 85 with the fixed stop 97.

In the event that high torque forces are required in order to break out a pipe joint or to make up such a joint, fluid pressure within the expandable tube 89 may be increased, correspondingly increasing the frictional resistance provided by the brake means to further rotation of the inner ring assembly 20 along with the pipe joint engaged by the tong dies 70. This will result in further radial force being applied to the tong dies 70 by the action of the cam surfaces 57a or 57b, as the case may be, on the rollers 56 of the respective jaws 21.

While the specific details of an illustrative embodiment of the invention have been herein shown and described, changes and alterations may be made without departing from the spirit of the invention.

What is claimed is:

1. In a power tong for making up and breaking out joints of pipe having threaded joint parts, pipe gripping means including a plurality of jaws shiftable between pipe gripping and retracted positions, an inner ring carrying said jaws, an outer ring carrying said inner ring for relative rotative movement thereof, cam means for moving said jaws from said retracted position to said pipe gripping position responsive to rotation of said outer ring relative to said inner ring in either direction, a stationary support for said outer ring, power means on said support for driving said outer ring rotatively in opposite directions, and brake means for initially holding said inner ring against rotation to cause said cam means to move said jaws: the improvement wherein said brake means comprises an outwardly facing cylindrical wall on said inner ring, a brake band extending circumferentially substantially entirely about said wall and in engagement with said wall, and in engagement with said wall, and circumferentially extended variable fluid pressure operated means including an expansible member engaged with said brake band throughout substantially the entire circumferential extent of said brake band for forcing said brake band into engagement with said wall through substantially the entire circumferential extent of said band.

2. A power tong as defined in claim 1, wherein said fluid pressure operated means comprises an expansible tube, and a circumferentially extended rigid member holding said tube in engagement with said wall.

3. A power tong as defined in claim 1, wherein said fluid pressure operated means comprises an expansible tube, and a circumferentially extended rigid member holding said tube in engagement with said wall, said tube having ends connected to a common source of fluid under pressure and being engaged between said ends with said wall.

4. A power tong as defined in claim 1, wherein said fluid pressure operated means includes means for anchoring said brake band on said support against movement with said inner ring in either direction.

5. A power tong as defined in claim 1, wherein said brake band has end portions provided with abutments, and said fluid pressure operated means includes means for alternately anchoring said abutments on said support responsive to rotation of said inner ring in opposite directions.

6. A power tong as defined in claim 1, wherein said brake band has end portions provided with abutments, and said fluid pressure operated means include a circumferentially extended rigid member forming with said wall a chamber in which said expansible member is disposed, said rigid member having abutment means thereon, and said support has a stop engageable by said abutment means to prevent rotation of said rigid member in either direction with said inner ring.

7. A power tong as defined in claim 1, wherein said fluid pressure operated means comprises a circumferentially extended rigid channel forming a chamber with said wall, said expansible member comprising a tube confined between said channel and said wall and being deformed into engagement with said wall.

8. A power tong as defined in claim 1, wherein said fluid pressure operated means comprises a circumferentially extended rigid channel forming a chamber with said wall, said channel and said support having means for preventing rotation of said channel relative to said support in either direction, and said channel and said brake band having means for limiting rotation of said brake band with said inner ring in either direction.

9. A power tong as defined in claim 1, wherein said fluid pressure operated means comprises a circumferentially extended rigid channel forming a chamber with said wall, said expansible member comprising a tube confined between said channel and said wall and being deformed into engagement with said wall, said tube having ends, and including a fluid connector interposed between said ends of said tube and connected thereto for supplying fluid to both ends of said tube.

10. A power tong as defined in claim 1, wherein said fluid pressure operated means comprises a circumferentially extended rigid channel having opposing ends, said channel and said wall defining a chamber therebetween, said expansible member comprising a tube deformed between said channel and said wall and having ends adjacent the ends of said channel, and including a fluid connector interposed between said ends of said channel and connected to the ends of said tube for simultaneously supplying fluid to both ends of said tube.

References Cited

UNITED STATES PATENTS

| | | | |
|---|---|---|---|
| 2,710,078 | 6/1955 | Cardwell | 188—152.86A |
| 2,522,809 | 9/1950 | Austin | 188—152.86A |
| 3,180,186 | 4/1965 | Catland | 81—57.18 |
| 3,380,323 | 4/1968 | Campbell | 81—57.16 |
| 2,618,468 | 11/1952 | Lundeen | 81—57.19 |
| 3,261,241 | 7/1966 | Catland | 81—57.18 |
| 2,466,990 | 4/1949 | Johnson et al. | 188—152.86A |
| 2,417,855 | 3/1947 | Barish | 188—152.86A |

JAMES L. JONES, JR., Primary Examiner

U.S. Cl. X.R.

81—57.18

PO-1050
(5/69)

UNITED STATES PATENT OFFICE
CERTIFICATE OF CORRECTION

Patent No. 3,550,485　　　　　　Dated December 29, 1970

Inventor(s) John L. Dickmann and Garth F. Nicolson

It is certified that error appears in the above-identified patent and that said Letters Patent are hereby corrected as shown below:

Sheets 1-6 of Drawings, "J.L. Dickmann" should be
        --J.L. Dickmann et al--.
    Fig. 1, cancel numeral "12" and its lead line and arrow.
    Fig. 2, cancel numeral "12" and its lead line and arrow.
    Fig. 3, "67" should be --68-- (lower center of drawing,
        next to -51-).
    Fig. 4, cancel "14" and its lead line.
    Fig. 5, "67" should be --68-- (between numerals 57b and 6
    Fig. 6, "192b" should be --192a--.
    Fig. 8, cancel "86" (upper left of drawing, next to 189).
    Fig. 9, "48" should be --47-- (between numerals 85 and 9
    Fig. 11, "93" should be --92a--.
    Col. 4, line 52, after "upper" should be --outer--.
    Col. 9, line 12, after "direction" should be a period (.)
"when" should be --When--.
    Col. 10, lines 37-38 (lines 17-18 of claim 1), cancel
duplication "and in engagement with said wall,".

Signed and sealed this 29th day of June 1971.

(SEAL)
Attest:

EDWARD M. FLETCHER, JR.　　　　　　WILLIAM E. SCHUYLER, JR.
Attesting Officer　　　　　　　　　　Commissioner of Patents